(12) United States Patent
Lee

(10) Patent No.: US 10,380,131 B2
(45) Date of Patent: Aug. 13, 2019

(54) AUTOMATED DATA CONVERSION AND ROUTE TRACKING IN DISTRIBUTED DATABASES

(75) Inventor: Adrian Lee, Stockbridge (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1417 days.

(21) Appl. No.: 13/594,157

(22) Filed: Aug. 24, 2012

(65) Prior Publication Data

US 2012/0323949 A1     Dec. 20, 2012

Related U.S. Application Data

(63) Continuation of application No. 12/248,140, filed on Oct. 9, 2008, now Pat. No. 8,301,583.

(51) Int. Cl.
*G06F 16/25* (2019.01)
*G06F 16/2458* (2019.01)

(52) U.S. Cl.
CPC ........ *G06F 16/2471* (2019.01); *G06F 16/258* (2019.01)

(58) Field of Classification Search
CPC ............... G06F 17/30545; G06F 17/30569
See application file for complete search history.

(56) References Cited

U.S. PATENT DOCUMENTS

| | | | |
|---|---|---|---|
| 5,201,046 A | 4/1993 | Goldberg et al. | |
| 5,295,256 A | 3/1994 | Bapat | |
| 5,408,652 A | 4/1995 | Hayashi et al. | |
| 5,418,950 A | 5/1995 | Li et al. | |
| 5,701,453 A | 12/1997 | Maloney et al. | |
| 5,734,887 A * | 3/1998 | Kingberg | G06F 17/30595 |
| 5,794,229 A | 8/1998 | French et al. | |
| 5,873,088 A | 2/1999 | Hayashi et al. | |
| 5,903,893 A | 5/1999 | Kleewein et al. | |
| 5,937,402 A | 8/1999 | Pandit | |
| 6,016,497 A | 1/2000 | Suver | |

(Continued)

OTHER PUBLICATIONS

United States Patent and Trademark Office, Office Action for U.S. Appl. No. 12/248,304, dated Feb. 14, 2014, pp. 1-26, Alexandria, VA, USA.

(Continued)

*Primary Examiner* — Mark D Featherstone
*Assistant Examiner* — Navneet Gmahl
(74) *Attorney, Agent, or Firm* — Lee Law, PLLC; Christopher B. Lee

(57) ABSTRACT

A determination is made as to whether a data type associated with a received logical table definition associated with a database query within a distributed database system differs from a data type associated with a local logical table definition. A data conversion is performed on data retrieved from a locally-stored physical table referenced by the local logical table definition in response to determining that the data types differ. Local data conversion information is created identifying the data conversion performed on the retrieved data in response to performing the data conversion. At least one of the retrieved data and the converted data with the created local data conversion information is forwarded to at least one of a distributed database node and an application-level module.

20 Claims, 6 Drawing Sheets

(56) References Cited

U.S. PATENT DOCUMENTS

| | | |
|---|---|---|
| 6,175,837 B1 | 1/2001 | Sharma et al. |
| 6,226,788 B1 | 5/2001 | Schoening et al. |
| 6,262,976 B1 | 7/2001 | McNamara |
| 6,263,328 B1 | 7/2001 | Coden et al. |
| 6,457,007 B1 | 9/2002 | Kikuchi et al. |
| 6,694,306 B1* | 2/2004 | Nishizawa ........ G06F 17/30457 707/714 |
| 6,708,186 B1 | 3/2004 | Claborn et al. |
| 6,950,823 B2 | 9/2005 | Amiri et al. |
| 7,216,133 B2 | 5/2007 | Wu et al. |
| 7,246,108 B2 | 7/2007 | Ahmed |
| 7,251,653 B2 | 7/2007 | Huang et al. |
| 7,403,956 B2 | 7/2008 | Vaschillo et al. |
| 7,461,076 B1* | 12/2008 | Weissman ........ G06F 17/30595 |
| 7,596,550 B2 | 9/2009 | Mordvinov et al. |
| 7,664,758 B1 | 2/2010 | Urano et al. |
| 7,693,900 B2 | 4/2010 | Wilmering et al. |
| 7,725,603 B1 | 5/2010 | Kanevsky et al. |
| 7,752,213 B2 | 7/2010 | Todd |
| 7,882,132 B2* | 2/2011 | Ghatare ............ G06F 17/30569 707/782 |
| 7,908,266 B2 | 3/2011 | Zeringue et al. |
| 7,921,131 B2 | 4/2011 | Uppala |
| 7,974,961 B2 | 7/2011 | Barbarek |
| 8,051,213 B2 | 11/2011 | Van Hensbergen et al. |
| 8,160,984 B2* | 4/2012 | Hunt ................. G06Q 20/0855 358/474 |
| 8,200,684 B2 | 6/2012 | Seitz et al. |
| 8,311,998 B2 | 11/2012 | Correll, Jr. |
| 2003/0009551 A1 | 1/2003 | Benfield et al. |
| 2003/0093647 A1 | 5/2003 | Mogi et al. |
| 2003/0120651 A1* | 6/2003 | Bernstein .......... G06F 17/30569 |
| 2003/0172056 A1 | 9/2003 | Dettinger et al. |
| 2004/0044727 A1 | 3/2004 | Abdelaziz et al. |
| 2004/0181522 A1 | 9/2004 | Jardin |
| 2005/0027701 A1* | 2/2005 | Zane ......................... G06F 8/30 |
| 2005/0030952 A1* | 2/2005 | Elmasry .............. H04L 12/5695 370/395.2 |
| 2005/0065925 A1 | 3/2005 | Weissman et al. |
| 2005/0096124 A1 | 5/2005 | Stronach |
| 2005/0138073 A1 | 6/2005 | Zhou et al. |
| 2005/0182758 A1* | 8/2005 | Seitz .................... G06F 9/5016 |
| 2005/0223022 A1 | 10/2005 | Weissman et al. |
| 2005/0246338 A1 | 11/2005 | Bird |
| 2006/0004750 A1 | 1/2006 | Huang et al. |
| 2006/0053112 A1 | 3/2006 | Chitkara et al. |
| 2006/0106473 A1* | 5/2006 | Enright ................. G06Q 10/06 700/96 |
| 2006/0136363 A1 | 6/2006 | Nguyen et al. |
| 2006/0136469 A1 | 6/2006 | Dettinger et al. |
| 2006/0225072 A1 | 10/2006 | Lari et al. |
| 2006/0294065 A1 | 12/2006 | Dettinger |
| 2007/0002869 A1 | 1/2007 | Miller |
| 2007/0043697 A1 | 2/2007 | Driesch, Jr. et al. |
| 2007/0077036 A1 | 4/2007 | Ando et al. |
| 2007/0143369 A1 | 6/2007 | Uppala |
| 2007/0239759 A1 | 10/2007 | Shen et al. |
| 2008/0071760 A1 | 3/2008 | Dettinger et al. |
| 2008/0232798 A1* | 9/2008 | Kasezawa .......... H04B 10/0791 398/34 |
| 2008/0291926 A1 | 11/2008 | Hayashi |
| 2008/0310302 A1 | 12/2008 | Detwiler et al. |
| 2009/0063453 A1 | 3/2009 | Adler et al. |
| 2009/0063524 A1 | 3/2009 | Adler et al. |
| 2009/0077075 A1 | 3/2009 | Bent et al. |
| 2009/0083379 A1 | 3/2009 | Bent et al. |
| 2009/0157684 A1 | 6/2009 | Andersen et al. |
| 2009/0193006 A1 | 6/2009 | Herrnstadt |
| 2010/0094851 A1 | 4/2010 | Bent et al. |
| 2010/0094862 A1 | 4/2010 | Bent et al. |
| 2010/0094882 A1 | 4/2010 | Lee |
| 2010/0094892 A1 | 4/2010 | Bent et al. |
| 2010/0094902 A1 | 4/2010 | Vyvyan |
| 2010/0100556 A1 | 4/2010 | Correll, Jr. |
| 2011/0173219 A1 | 7/2011 | Bent et al. |
| 2012/0136898 A1 | 5/2012 | Bent et al. |
| 2012/0179720 A1 | 7/2012 | Seitz et al. |
| 2012/0303609 A1 | 11/2012 | Bent et al. |
| 2016/0117369 A1 | 4/2016 | Bent et al. |

OTHER PUBLICATIONS

United States Patent and Trademark Office, Notice of Allowance for U.S. Appl. No. 12/248,304, dated Jul. 2, 2015, pp. 1-11, Alexandria, VA, USA.

United States Patent and Trademark Office, Notice of Allowance for U.S. Appl. No. 12/248,241, dated Nov. 14, 2012, pp. 1-31, Alexandria, VA, USA.

United States Patent and Trademark Office, Office Action for U.S. Appl. No. 13/364,728, dated Nov. 8, 2012, pp. 1-31, Alexandria, VA, USA.

United States Patent and Trademark Office, Office Action for U.S. Appl. No. 12/248,304, dated Nov. 20, 2014, pp. 1-18, Alexandria, VA, USA.

United States Patent and Trademark Office, Office Action for U.S. Appl. No. 12/248,082, dated Jan. 4, 2011, pp. 1-19, Alexandria, VA, USA.

United States Patent and Trademark Office, Office Action for U.S. Appl. No. 12/248,082, dated Apr. 27, 2011, pp. 1-22, Alexandria, VA, USA.

United States Patent and Trademark Office, Notice of Allowance for U.S. Appl. No. 12/248,082, dated Nov. 30, 2011, pp. 1-14, Alexandria, VA, USA.

United States Patent and Trademark Office, Office Action for U.S. Appl. No. 12/248,109, dated Mar. 1, 2011, pp. 1-13, Alexandria, VA, USA.

United States Patent and Trademark Office, Office Action for U.S. Appl. No. 12/248,109, dated Sep. 1, 2011, pp. 1-20, Alexandria, VA, USA.

United States Patent and Trademark Office, Office Action for U.S. Appl. No. 12/248,109, dated Dec. 7, 2011, pp. 1-18, Alexandria, VA, USA.

United States Patent and Trademark Office, Office Action for U.S. Appl. No. 12/248,140, dated Apr. 13, 2011, pp. 1-15, Alexandria, VA, USA.

United States Patent and Trademark Office, Office Action for U.S. Appl. No. 12/248,140, dated Oct. 13, 2011, pp. 1-18, Alexandria, VA, USA.

United States Patent and Trademark Office, Office Action for U.S. Appl. No. 12/248,170, Mar. 17, 2011, pp. 1-12, Alexandria, VA, USA.

United States Patent and Trademark Office, Office Action for U.S. Appl. No. 12/248,170, dated Sep. 30, 2011, pp. 1-18, Alexandria, VA, USA.

United States Patent and Trademark Office, Office Action for U.S. Appl. No. 12/248,241, dated May 13, 2011, pp. 1-28, Alexandria, VA, USA.

United States Patent and Trademark Office, Office Action for U.S. Appl. No. 12/248,241, dated Nov. 9, 2011, pp. 1-33, Alexandria, VA, USA.

United States Patent and Trademark Office, Office Action for U.S. Appl. No. 12/248,304, dated Apr. 1, 2011, pp. 1-19, Alexandria, VA, USA.

United States Patent and Trademark Office, Office Action for U.S. Appl. No. 12/248,304, dated Sep. 19, 2011, pp. 1-25, Alexandria, VA, USA.

Boon-Chong Seet, et al., Route discovery optimization for dynamic source routing in mobile ad hoc networks, Article, Sep. 15, 2000, pp. 1-7, School of Computer Engineering, Nanyang Technological University, Singapore.

Roy Morien, Agile Development of the Database: A Focal Entity Prototyping Approach, Proceedings of the Agile Development Conference (ADC '05), 2005, pp. 103-110 (1-8), IEEE Computer Society, Published on the World Wide Web.

(56) References Cited

OTHER PUBLICATIONS

Joseph Sack, SQL Server 2008 Transact-SQL Recipes: Chapter 4—Tables, Book, Jul. 25, 2008, pp. 143-195, Springer-Verlag New York, Inc., New York, NY, USA.
United States Patent and Trademark Office, Office Action for U.S. Appl. No. 12/248,109, dated May 8, 2012, pp. 1-22, Alexandria, VA, USA.
United States Patent and Trademark Office, Notice of Allowance for U.S. Appl. No. 12/248,140, dated Jun. 21, 2012, pp. 1-30, Alexandria, VA, USA.
United States Patent and Trademark Office, Notice of Allowance for U.S. Appl. No. 12/248,170, dated May 24, 2012, pp. 1-24, Alexandria, VA, USA.
United States Patent and Trademark Office, Office Action for U.S. Appl. No. 12/248,241, dated Apr. 26, 2012, pp. 1-53, Alexandria, VA, USA.
United States Patent and Trademark Office, Office Action for U.S. Appl. No. 12/248,304, dated Jun. 19, 2012, pp. 1-21, Alexandria, VA, USA.
United States Patent and Trademark Office, Office Action for U.S. Appl. No. 13/364,728, dated Jun. 12, 2012, pp. 1-34, Alexandria, VA, USA.
United States Patent and Trademark Office, Notice of Allowance for U.S. Appl. No. 13/561,659, dated Aug. 29, 2013, pp. 1-22, Alexandria, VA, USA.
United States Patent and Trademark Office, Notice of Allowance for U.S. Appl. No. 12/248,109, dated Jan. 25, 2013, pp. 1-19, Alexandria, VA, USA.
United States Patent and Trademark Office, Office Action for U.S. Appl. No. 12/248,304, dated Jan. 17, 2013, pp. 1-17, Alexandria, VA, USA.
United States Patent and Trademark Office, Office Action for U.S. Appl. No. 13/561,659, Feb. 15, 2013, pp. 1-34, Alexandria, VA, USA.
United States Patent and Trademark Office, Notice of Allowance for U.S. Appl. No. 13/364,728, dated May 20, 2013, pp. 1-21, Alexandria, VA, USA.
Daniel Lopresti, et al., A Tabular Survey of Automated Table Processing, Proceedings of the Third International Workshop on Graphics Recognition, Recent Advances (GREC'99), 2000, pp. 93-120, Springer-Verlag, London, UK.
Esperanza Marcos, et al., A Methodological Approach for Object-Relational Database Design using UML, Article: Software System Model, vol. 2, Issue 1, Mar. 2003, pp. 59-72, Springer-Verlag, Published online.
United States Patent and Trademark Office, Notice of Allowance for U.S. Appl. No. 14/871,817, dated Jun. 22, 2016, pp. 1-9, Alexandria, VA, USA.
United States Patent and Trademark Office, Office Action for U.S. Appl. No. 14/871,817, dated Mar. 17, 2016, pp. 1-23, Alexandria, VA, USA.

\* cited by examiner

AUTOMATED DATA CONVERSION AND ROUTE TRACKING IN DISTRIBUTED DATABASES

RELATED APPLICATIONS

This application is a continuation of and claims priority to and claims the benefit of U.S. patent application Ser. No. 12/248,140 titled "AUTOMATED DATA CONVERSION AND ROUTE TRACKING IN DISTRIBUTED DATABASES," which was filed in the United States Patent and Trademark Office on Oct. 9, 2008, now U.S. Pat. No. 8,301,583 which has a current status of "Allowed," and which is incorporated herein by reference in its entirety.

This application is further related to U.S. Patent Application titled "AUTOMATED PROPAGATION OF NON-CONFLICTING QUERIES IN DISTRIBUTED DATABASES," which was filed in the United States Patent and Trademark Office on Oct. 9, 2008, and assigned application Ser. No. 12/248,082, and which issued as U.S. Pat. No. 8,145,652 on Mar. 27, 2012; to U.S. Patent Application titled "AUTOMATED DATA SOURCE ASSURANCE IN DISTRIBUTED DATABASES," which was filed in the United States Patent and Trademark Office on Oct. 9, 2008, and assigned application Ser. No. 12/248,109; to U.S. Patent Application titled "AUTOMATED QUERY PATH REPORTING IN DISTRIBUTED DATABASES," which was filed in the United States Patent and Trademark Office on Oct. 9, 2008, and assigned application Ser. No. 12/248,170, and which has a current status of "Allowed;" to U.S. Patent Application titled "DYNAMIC CONTEXT DEFINITIONS IN DISTRIBUTED DATABASES," which was filed in the United States Patent and Trademark Office on Oct. 9, 2008, and assigned application Ser. No. 12/248,241; to U.S. Patent Application titled "NODE-LEVEL SUB-QUERIES IN DISTRIBUTED DATABASES," which was filed in the United States Patent and Trademark Office on Oct. 9, 2008, and assigned application Ser. No. 12/248,304; to U.S. Patent Application titled "AUTOMATED PROPAGATION OF NON-CONFLICTING QUERIES IN DISTRIBUTED DATABASES," which was filed in the United States Patent and Trademark Office on Feb. 2, 2012, and assigned application Ser. No. 13/364,728; and to U.S. Patent Application titled "AUTOMATED QUERY PATH REPORTING IN DISTRIBUTED DATABASES," which was filed in the United States Patent and Trademark Office on Jul. 30, 2012, and assigned application Ser. No. 13/561,659; each of which is hereby incorporated by reference as if fully set forth herein.

This application is also related to the application titled "AN APPARATUS FOR PROPAGATING A QUERY," which was filed in the United Kingdom on Sep. 19, 2007, with application Ser. No. 07/182,512; to the application titled "AN APPARATUS FOR STORING A LOGICAL STATEMENT," which was filed in the United Kingdom on Sep. 19, 2007, with application Ser. No. 07/182,140; to the application titled "AN APPARATUS FOR ENABLING CONNECTIONS," which was filed in the United Kingdom on Sep. 19, 2007, with application Ser. No. 07/182,488; and to U.S. Patent Application titled "ENABLING CONNECTIONS FOR USE WITH A NETWORK" which was filed in the United States Patent and Trademark Office on Apr. 11, 2008, with application Ser. No. 12/101,220, and which has a current status of "Allowed;" each of which is hereby incorporated by reference as if fully set forth herein.

STATEMENT REGARDING FEDERALLY-SPONSORED RESEARCH OR DEVELOPMENT

This invention was made with Government support under W911NF-06-3-0001 awarded by United States Army. The Government has certain rights to this invention.

BACKGROUND

The present invention relates to systems and methods for identifying data conversion events in distributed databases. More particularly, the present invention relates to automated data conversion and route tracking in distributed databases.

Distributed databases include multiple databases accessible via a network or other interconnection by a querying computing node. The distributed databases may be logically distributed across multiple access or network domains and may be geographically distributed across physical locations. The querying computing node often uses a centralized registry to identify databases and physical data structures within the identified databases. The physical data structures are identified and accessible globally by name. Queries are issued to an identified database using an identified global name of a physical data structure. Query results are returned from the identified database in response to the issued query.

BRIEF SUMMARY

The subject matter described herein provides capabilities for automated data conversion and route tracking in distributed databases. Logical data structures (e.g., table definitions) are transmitted in association with a database query within a distributed database system. Upon receipt of the query, a database node determines whether to perform a data conversion on retrieved local physical data based upon a difference between a data type associated with the received logical table definition and a data type associated with a local logical table definition. Data conversion information identifying any data conversion performed or that no conversion was performed is created to allow tracking of data conversion operations within the distributed database system. The data conversion information is passed on to the originating node along with data conversion information received from other distributed database nodes. The retrieved local physical data is returned to the originating node for processing or to an application-level module when no conversion is performed. The converted data and the created data conversion information are forwarded to other nodes for processing or to an application-level module when a data conversion is performed. The data conversion information may be used by any node to identify where data conversion or casting precision loss or precision problems occur within the distributed database system. A cache of queries transmitted and resulting data conversion information returned may be maintained and used to identify optimal routes for future query transmissions to remove or minimize casting operations.

A method includes determining whether a data type associated with a received logical table definition associated with a database query within a distributed database system differs from a data type associated with a local logical table definition; performing a data conversion on data retrieved from a locally-stored physical table referenced by the local logical table definition in response to determining that the data type associated with the received logical table definition differs from the data type associated with a local logical table definition; creating local data conversion information identifying the data conversion performed on the retrieved data in response to performing the data conversion; and forwarding at least one of the retrieved data and the converted data with the created local data conversion information to at least one of a distributed database node and an application-level module.

A system includes a memory adapted to store data conversion and route tracking information; and a processor programmed to: determine whether a data type associated with a received logical table definition associated with a database query within a distributed database system differs from a data type associated with a local logical table definition, perform a data conversion on data retrieved from a locally-stored physical table referenced by the local logical table definition in response to determining that the data type associated with the received logical table definition differs from the data type associated with a local logical table definition, create local data conversion information identifying the data conversion performed on the retrieved data in response to performing the data conversion, and forward at least one of the retrieved data and the converted data with the created local data conversion information to at least one of a distributed database node and an application-level module.

An alternative system includes a memory adapted to store data conversion and route tracking information; and a processor programmed to: determine whether a data type associated with a received logical table definition associated with a database query within a distributed database system differs from a data type associated with a local logical table definition, perform a data conversion on data retrieved from a locally-stored physical table referenced by the local logical table definition in response to determining that the data type associated with the received logical table definition differs from the data type associated with a local logical table definition, create local data conversion information identifying the data conversion performed on the retrieved data in response to performing the data conversion, add a node identifier to the local data conversion information, determine whether the data conversion performed on the retrieved data results in a loss of precision associated with the converted data, add local conversion precision loss tracking information to the local data conversion information in response to determining that the data conversion performed on the retrieved data results in a loss of precision associated with the converted data, and forward at least one of the retrieved data and the converted data with the created local data conversion information to at least one of a distributed database node and an application-level module.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION

Figure 1:
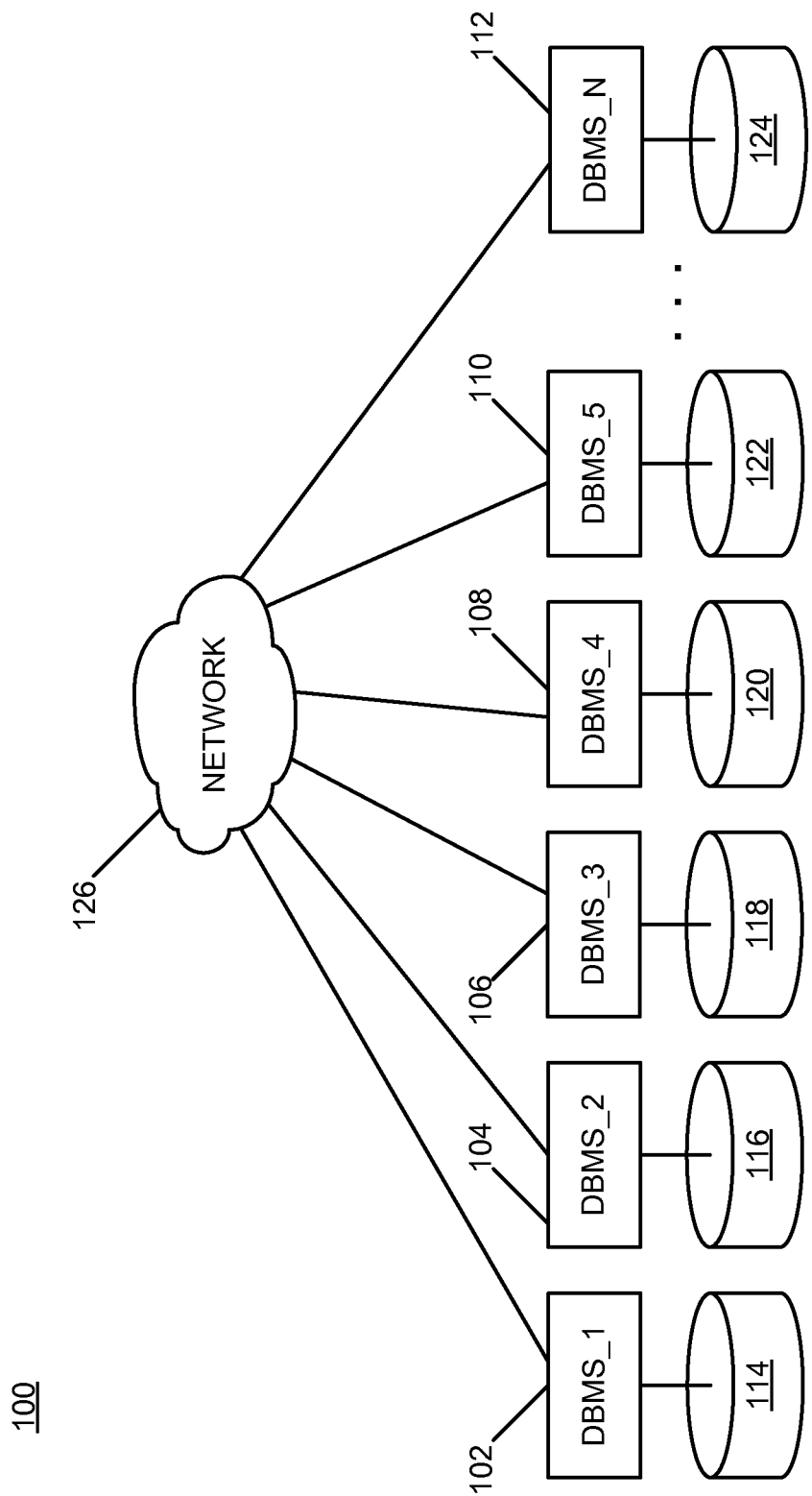
FIG. 1 is a block diagram of an example of an implementation of a system for automated data conversion and route tracking in distributed databases according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides capabilities for automated data conversion and route tracking in distributed databases. Logical data structures (e.g., table definitions) are transmitted in association with a database query within a distributed database system. Upon receipt of the query, a database node determines whether to perform a data conversion on retrieved local physical data based upon a difference between a data type associated with the received logical table definition and a data type associated with a local logical table definition. Data conversion information identifying any data conversion performed or that no conversion was performed is created to allow tracking of data conversion operations within the distributed database system. The data conversion information is passed on to the originating node along with data conversion information received from other distributed database nodes. The retrieved local physical data is returned to the originating node for processing or to an application-level module when no conversion is performed. The converted data and the created data conversion information are forwarded to other nodes for processing or to an application-level module when a data conversion is performed. The data conversion information may be used by any node to identify where data conversion or casting precision loss or precision problems occur within the distributed database system. A cache of queries transmitted and resulting data conversion information returned may be maintained and used to identify optimal routes for future query transmissions to remove or minimize casting operations.

The automated data conversion and route tracking in distributed databases described herein may be performed in real time to allow prompt tracking of data conversions and query route optimization. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

FIG. 1 is a block diagram of an example of an implementation of a system 100 for automated data conversion and route tracking in distributed databases. Within the system 100, a database management system_1 (DBMS_1) 102, a DBMS_2 104, a DBMS_3 106, a DBMS_4 108, a DBMS_5 110, up to a DBMS_N 112 are illustrated. The DBMS_1 102 through the DBMS_N 112 are each associated with a database 114, a database 116, a database 118, a database 120, a database 122, up to a database 124, respectively. The DBMS_1 102 through the DBMS_N 112 are interconnected via a network 126.

For purposes of the present description, it should be noted that while the network 126 is illustrated as interconnecting the DBMS_1 102 through the DBMS_N 112 with each other, this should not be considered limiting. The network 126 may be formed by any interconnection appropriate for use in a distributed database environment. For example, the network 126 may include any form of interconnection suitable for the intended purpose, including a private or public network such as an intranet or the Internet, respectively, direct inter-module interconnection, dial-up, or any other interconnection mechanism capable of interconnecting the devices with the system 100.

As such, any two or more of the DBMS_1 102 through the DBMS_N 112 may be interconnected by proximity, interconnection, or routing capabilities within the system 100, while certain other of the devices may not have interconnectivity other than via other distributed database devices. Accordingly, certain of the DBMS_1 102 through the DBMS_N 112 may not be capable of communication with one another other than via the other distributed database devices.

As will be described in more detail below in association with FIGS. 2 through 6 below, the DBMS_1 102 through the DBMS_N 112 provide automated data conversion and route tracking within the system 100. The automated data conversion and route tracking in distributed databases is based upon propagation of data conversion information identifying data conversions performed in association with database queries.

It should be noted that the DBMS_1 102 through the DBMS_N 112 may be any type of device configurable for storage of information and distributed interconnectivity for database-style queries. For example, the DBMS_1 102 through the DBMS_N 112 may include devices such as a personal computer (e.g., desktop, laptop, palm, etc.) or a handheld device (e.g., cellular telephone, personal digital assistant (PDA), email device, music recording or playback device, etc.), or any other device capable of processing information as described above and in more detail below.

Figure 2:
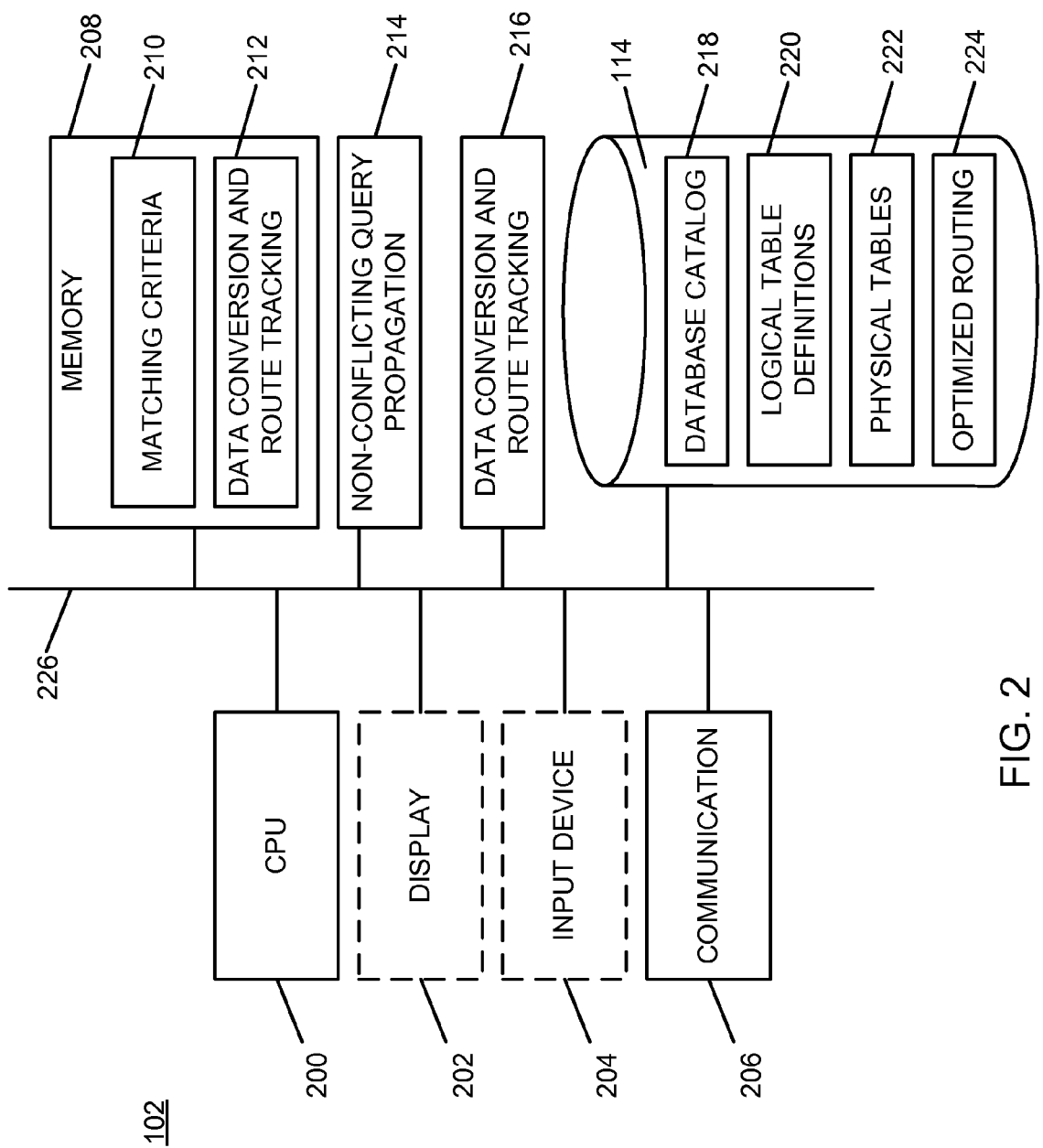
FIG. 2 is a block diagram of an example of an implementation of a database management system that is capable of performing automated data conversion and route tracking based upon propagation of data conversion information in association with a database query within a distributed database system according to an embodiment of the present subject matter.

FIG. 2 is a block diagram of an example of an implementation of the DBMS_1 102 that is capable of performing automated data conversion and route tracking based upon propagation of data conversion information in association with a database query within a distributed database system, such as the system 100. A central processing unit (CPU) 200 provides computer instruction execution, computation, and other capabilities within the DBMS_1 102. A display 202 provides visual information to a user of the DBMS_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are not required components for the DBMS_1 102. Accordingly, the DBMS_1 102 may operate as a completely automated embedded device without user configurability or feedback. However, the DBMS_1 102 may also provide user feedback and configurability via the display 202 and the input device 204, respectively.

A communication module 206 provides interconnection capabilities that allow the DBMS_1 102 to communicate with other modules within the system 100, such as the DBMS_2 104 through the DBMS_N 112, to perform data conversion and route tracking within the system 100. The communication module 206 may include any electrical, protocol, and protocol conversion capabilities useable to provide the interconnection capabilities.

A memory 208 includes a matching criteria storage area 210 that stores information usable to identify processing preferences or priorities for non-conflicting queries within the system 100. The matching criteria stored within the matching criteria storage area 210 are used to configure and control query data selection and processing, query forwarding, and query responses. The memory 208 also includes a data conversion and route tracking storage area 212 that stores data conversion and route tracking information usable to track data conversions and to optimize query routing within the system 100. As will be described in more detail below, the data conversion and route tracking information stored within the data conversion and route tracking storage area 212 is used to track data conversion precision changes and data conversion precision loss. The tracked data conversion precision changes and data conversion precision loss information may be used to optimize routing within a distributed database system, such as the system 100.

A non-conflicting query propagation module 214 is illustrated. The non-conflicting query propagation module 214 provides query processing, query forwarding, and query response capabilities for the DBMS_1 102. A data conversion and route tracking module 216 is also illustrated. The data conversion and route tracking module 216 provides the data conversion and route tracking capabilities for distributed database devices, such as the DBMS_1 102, as described above and in more detail below.

Though the communication module 206, the non-conflicting query propagation module 214, and the data conversion and route tracking module 216 are illustrated as componentlevel modules for ease of illustration and description purposes, it should be noted that these modules include any hardware, programmed processor(s), and memory used to carry out the respective functions of the modules as described above and in more detail below. For example, the communication module 206, the non-conflicting query propagation module 214, and the data conversion and route tracking module 216 may include additional controller circuitry in the form of application specific integrated circuits (ASICs), processors, antennas, and/or discrete integrated circuits and components for performing communication and electrical control activities associated with the respective modules. Additionally, the communication module 206, the non-conflicting query propagation module 214, and the data conversion and route tracking module 216 also include interrupt-level, stack-level, and application-level modules as appropriate. Furthermore, the modules include any memory components used for storage, execution, and data processing for performing processing activities associated with the respective modules. The communication module 206, the non-conflicting query propagation module 214, and the data conversion and route tracking module 216 may also form a portion of other circuitry described without departure from the scope of the present subject matter.

The database 114 provides storage capabilities for information associated with the automated propagation of non-conflicting queries and data conversion and route tracking capabilities of the DBMS_1 102. The database 114 includes a database catalog storage area 218, a logical table definition storage area 220, a physical table storage area 222, and an optimized routing storage area 224 that may be stored in the form of tables or other arrangements accessible by the DBMS_1 102.

The database catalog storage area 218 stores information associated with logical tables stored at other database management systems, such as the DBMS_2 104 through the DBMS_N 112, within the system 100. The information stored within the database catalog storage area 218 may be compiled in response to queries of other database nodes within the system 100 for logical table definitions stored at those other nodes. As such, the DMBS_1 102 may determine and store logical table definitions for other nodes within the system 100 for use during query processing.

The logical table definition storage area 220 stores information about logical tables stored locally to the DBMS_1 102. The logical tables map to physical data and physical tables stored within the physical table storage area 222. The physical table storage area 222 stores physical tables that may or may not be federated within a distributed database system, such as the system 100, based upon mappings defined within the respective logical table definition storage area 220.

The optimized routing storage area 224 stores information associated with preferred and/or optimal routes for distributed database queries as identified by the data conversion and route tracking module 216. As will be described in more detail below, logical table definitions are associated with database queries. Upon receipt of a database query, the receiving distributed database node, such as the DBMS_1 102, determines whether a data type associated with the received logical table definition differs from a data type associated with the local logical table definition. In response to determining that the data types differ, a data conversion is performed on data retrieved from a stored physical table, such as a physical table stored within the physical table storage area 222. Data conversion information is created to identify the data conversion performed. If a data conversion has been performed, the converted data and the created data conversion information are forwarded to at least one of a distributed database node and an application-level module for further processing. If no data conversion has been performed, the retrieved data is forwarded to at least one of a distributed database node and an application-level module for further processing. An indication that no data conversion was performed may also be propagated through the network.

Additional processing is performed by a receiving node based upon whether any data conversion information is received in association with a query or a data result set identifying any data conversions performed at any node that processed the query prior to the receiving node, as will be described in more detail below beginning with FIG. 3. The originating node or any intermediate node may process received and locally-created data conversion information to track routing and processing of queries and to determine whether to reject data from a previous node or to identify preferred routing for future queries. The preferred routing may be stored to the optimized routing storage area 224 and may be forwarded to other distributed database nodes to distribute determined route preferences.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the non-conflicting query propagation module 214, the data conversion and route tracking module 216, and the database 114 are interconnected via an interconnection 226. The interconnection 226 may include a system bus, a network, or any other interconnection capable of providing the respective components with suitable interconnection for the respective purpose.

While the DBMS_1 102 is illustrated with and has certain components described, other modules and components may be associated with the DBMS_1 102 without departure from the scope of the present subject matter. Additionally, it should be noted that, while the DBMS_1 102 is described as a single device for ease of illustration purposes, the components within the DBMS_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the DBMS_1 102 are possible and all are considered within the scope of the present subject matter. It should also be understood that, though the database catalog storage area 218, the logical table definition storage area 220, the physical table storage area 222, and the optimized routing storage area 224 are shown within the database 114, they may also be stored within the memory 208 without departure from the scope of the present subject matter. Accordingly, the DBMS_1 102 may take many forms and may be associated with many platforms.

Figure 3:
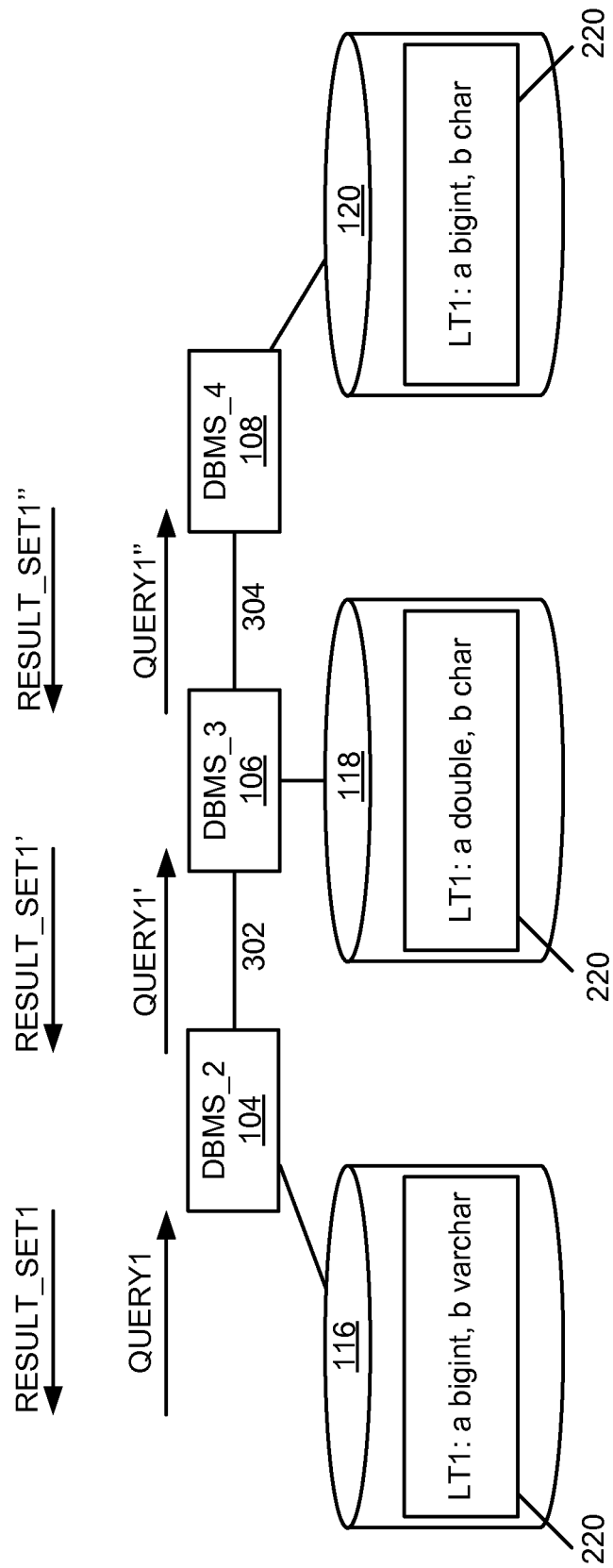
FIG. 3 is a block diagram of an example interconnection of components within the system 100 of FIG. 1 to further illustrate an example of query processing with data conversion and route tracking according to an embodiment of the present subject matter.

FIG. 3 is a block diagram of an example interconnection of components within the system 100 of FIG. 1 to further illustrate an example of query processing with data conversion and route tracking. It is understood that many other types of processing are possible, such as performing logical table matching, and other processing of queries. The logical table matching may be based upon matching criteria, such as matching criteria stored within the matching criteria storage area 210. Accordingly, all such other possible types of processing are considered within the scope of the present subject matter.

As can be seen from FIG. 3, the general representation of the network 126 has been replaced with a connection 302 interconnecting the DMBS_2 104 and the DBMS_3 106. Additionally, a connection 304 interconnecting the DMBS_3 106 and the DBMS_4 108 can also be seen in FIG. 3.

Within FIG. 3, the DBMS_2 104 is shown issuing a "Query1." The Query1 will be described in more detail below. As can be seen from FIG. 3, the logical table definition storage area 220 of each of the DBMS_2 104 through the DBMS_4 108 includes an example logical table definition. The logical table definition storage area 220 of the DBMS_2 104 includes a logical table definition of "LT1: a bigint, b varchar." The logical table definition storage area 220 of the DBMS_3 106 includes a logical table definition of "LT1: a double, b char." The logical table definition storage area 220 of the DBMS_4 108 includes a logical table definition of "LT1: a bigint, b char." Accordingly, the logical table definitions for the respective tables are different at each node that defines a given table.

With these example logical table definitions at each node identified, the following detailed query example of data conversion and route tracking elaborates upon the present subject matter. For purposes of the present example, the Query1 issued by DBMS_2 104 is assumed to be formed as shown in the following pseudo query format.

select a,b from logical table 'LT1' as LT1    (Query1)

As can be seen from the pseudo query format for Query1, a query is formed using a "select" query identifier. The character or characters (e.g., "a" and "b" within the present example) following the select query identifier represents a column name for the associated logical table. As such, the Query1 is a column name-based query. Within the present example, the Query1 requests data associated with a column named "a" and a column named "b." The Query1 instructs receiving distributed database nodes to use logical table definitions for fulfillment of the respective queries with the phrase "from logical table" within the Query 1. The requested logical table is shown within single quotation marks. As such, each the Query1 requests data associated with logical tables named "LT1." The second reference to "LT1" within the Query1 is an alias to a composite name for the logical table, again listed as "LT1" within the present example.

It should be noted that for purposes of the present description, a virtual table interface may be formed based upon the logical table definitions. The virtual table interface may be defined as a set of interfaces for representation of physical data for encapsulation and abstraction of the physical data within a distributed network of databases, such as the system 100. Class definitions may be constructed for creation and representation of the logical table definitions. For example, a class for a query may be defined in a syntactic representation, such as in Java™ programming language syntax, to accept a logical table name as an argument of a class constructor. A logical table definition may also be passed as a second argument to the class constructor. Upon instantiation, a query object may be created with the logical table name and a definition associated with the query object. Distributed database nodes may make calls into the query object for logical table information and processing.

It should be noted that though the example Query1 associated with FIG. 3 does not include communicated matching criteria, it is understood that the queries may be modified to include matching criteria without departure from the scope of the present subject matter. Further, matching criteria may be either communicated with the queries or may be stored locally in advance of issuance of a query. As such, default matching criteria may be established and stored within the matching criteria storage area 210 of the memory 208 at each distributed database node. For example, default matching may be strict matching for column name, column position within a logical table, column name data type, column name data precision, and other factors. Issued queries may modify default matching criteria to pass additional or alternative matching criteria instructing the receiving distributed database nodes to match based upon the additional matching criteria or to change default matching criteria. Example additional or alternative matching criteria include matching a column name in any position of a logical table, matching data precision based upon equal or greater precision within the respective logical table definitions, and other matching criteria. There are many other possible matching criteria that may be used and all are considered within the scope of the present subject matter.

Returning to the description of the present example, automated data conversion and route tracking associated with the Query1 will now be described. As described above, the Query1 is originated by the DBMS_2 104. The Query1 is processed internally by the DMBS_2 104 and is automatically propagated (e.g., forwarded) to other nodes for processing. Regarding the internal processing at the DMBS_2 104, the Query1 is compared with locally-defined logical tables to identify a local logical table named "LT1." As can be seen from FIG. 3, a local logical table named "LT1" is defined within the logical table definition storage area 220 of the DBMS_2 104. Accordingly, the Query1 is processed locally to identify a physical table mapped by the logical table "LT1" within the physical table storage area 222 (not shown) and will result in the value of data stored within the mapped physical table associated with the column "a" and the column "b" in the logical table "LT1" being returned from the local database 116.

The DMBS_2 104 also forwards the Query1 to the DBMS_3 106 for processing with Query 1' as the query name. As described above and in more detail below, the DMBS_2 104 includes its logical table definition with the forwarded query. For purposes of the present example, the forwarded Query 1' is assumed to be formed as shown in the following pseudo query format.

select a,b from new logical table 'LT1', 'a bigint, b
      varchar' as LT1    (Query1')

As can be seen from the pseudo query format for the forwarded Query1', the logical table definition of "LT1" associated with the DBMS_2 104 is forwarded as a portion of the forwarded Query1' to other nodes within the system 100.

Referring to the DBMS_3 106, upon receipt of the forwarded Query1', the DBMS_3 106 performs a variety of operations to forward and fulfill the data request associated with the forwarded Query1'. The DBMS_3 106 determines whether the received logical table definition matches a local logical table definition and processes matching logical table definitions. As will be described in more detail below, the DBMS_3 106 also forwards the query to at least one other distributed database node. In the present example, the DMBS_3 106 forwards the Query 1' to the DBMS_4 108 with Query1" as the query name. The DBMS_3 106 may also alter the forwarded logical table definition based upon its processing of the received logical table definition. For purposes of the present example, the forwarded Query 1' is assumed to be formed as shown in the following pseudo query format.

select a,b from logical table 'LT1', 'a double, b char' as LT1                    (Query1")

While processing at the respective distributed database nodes may be asynchronous and results may be returned when results have been processed at the respective nodes, the present example describes sequential processing for ease of illustration purposes. As such, a receiving node other than a final node associated with the query (e.g., the DBMS_4 108 in the present example) is described as receiving a result set from a node that it has forwarded a query to prior to responding to the query it receives. The DBMS_4 108 processes the query it receives and returns a result set without forwarding the query to any other node within the present example. It is understood that this example processing is for ease of illustration purposes only and any sequence of processing is considered within the scope of the present subject matter.

For example, all distributed database nodes may return results and data conversion information to the originating node and the originating node may determine acceptability of data conversions performed and may determine associated query route preferences. Alternatively, as with the present example, each distributed node may evaluate processing and data conversions performed by downstream nodes (e.g., nodes that a query was forwarded to) based upon results returned by the downstream nodes and may reject or accept data conversions and associate query route preferences with results returned to the originating node.

In accordance with the present example, processing at the DBMS_4 108 will be described before processing at the DBMS_3 106. Accordingly, regarding processing of the Query1" at the DBMS_4 108, the logical table defined in association with the DBMS_4 108 has a logical table named "LT1," but the data type associated with the column "a" does not match the received logical table definition for the logical table "LT1." The received logical table definition shows that the data type associated with the column "a" has a data type of "double." However, the logical table defined in association with the DBMS_4 108 has a data type of "bigint" for the column "a." It is again noted that the forwarded Query1" does not include any matching criteria, but that matching criteria could be forwarded with the Query1" or stored in association with the DBMS_4 108 without departure from the scope of the present subject matter.

Continuing with the present example, the DBMS_4 108 retrieves a data value referenced by the column "a" in the local logical table for "LT1" from an associated physical table storage area 222 (not shown) for processing. Based upon the mismatch of the data types for the column "a," the DBMS_4 108 casts the retrieved data value referenced by the column "a" in the local logical table for "LT1" from the data type "bigint" to the data type "double." The DBMS_4 108 also creates data conversion information identifying the data conversion performed on the retrieved data in response to the data conversion performed. The data conversion information may be created in any suitable form. For purposes of the present example, the form of an "array of operations" may be used. The array of operations may be a one dimensional or a multi-dimensional array of information based upon the information to be stored within the array of operations. As the last node within the present example to process the issued query, the DBMS_4 108 forwards the converted data with the created local data conversion information to at least one other distributed database node, such as to the DBMS_3 106 within the present example, as a Result_Set1".

The DBMS_3 106 receives the Result_Set1" from the DBMS_4 108. As described above, the DBMS_4 108 may have already processed the query upon receipt of the Result_Set1". The DBMS_3 106 may also have forwarded its results or may accumulate results for the originating node. For purposes of the present example, the DBMS_3 106 accumulates the query results for the originating node, makes determinations regarding any data casting or conversion operations performed by downstream nodes, and identifies preferences for query route processing. The query routing preferences may be stored within the optimized routing storage area 224 or otherwise for future query routing and processing. As such, the processing of the forwarded Query1' received from the DBMS_2 104 described below may have occurred by the time the Result_Set1" is received by the DBMS_3 106.

Regarding processing of the received Result_Set1", the DBMS_3 106 analyzes the returned data conversion information (e.g., an array of operations) and makes a determination as to whether the remote data conversion information identifying at least one data conversion operation performed by the downstream node is an acceptable data conversion. The DBMS_3 106 determines whether the data conversion performed on the data received from the DBMS_4 108 within the Result_Set1" results in a loss of precision associated with the converted data that is larger than a configured precision loss tolerance. For example, a precision loss tolerance may be configured and stored within the data conversion and route tracking storage area 212 of the memory 208. The precision loss tolerance may be based upon a percentage of loss in precision, specific casting between certain data types, or any other data precision related criteria. Accordingly, the DBMS_3 106 determines whether the data conversion performed on the data received from the DBMS_4 108 within the Result_Set1" results in a loss of precision beyond the configured precision loss tolerance. For purposes of the present example, it is assumed that a cast from type "bigint" to type "double" is acceptable and the DBMS_3 106 accepts the casting operation performed by the DBMS_4 108.

For a situation where a casting operation were to be considered unacceptable from a precision loss perspective or other consideration, the DBMS_3 106 may reject the data returned from the DBMS_4 108 and note the operation and the processing performed by the DBMS_4 108 as a non-preferred route within route tracking information appended to and returned in association with the data conversion information to the originating node. The non-preferred route information may also be stored within the optimized routing storage area 224 or the data conversion and route tracking storage area 212 for future reference and use in query routing within a distributed database system, such as the system 100.

Regarding processing of the Query1' at the DBMS_3 106, the logical table defined in association with the DBMS_3 106 has a logical table named "LT1," but the data type associated with both the column "a" and the column "b" do not match the received logical table definition for the logical table "LT1." The received logical table definition shows that the data type associated with the column "a" has a data type of "bigint." However, the logical table defined in association with the DBMS_3 106 has a data type of "double" for the column "a." Regarding column "b," the received logical table definition shows that the data type associated with the column "b" has a data type of "varchar," but the logical table defined in association with the DBMS_3 106 has a data type of "char" for the column "b." It is again noted that the forwarded Query 1' does not include any matching criteria, but that matching criteria could be forwarded with the Query 1' without departure from the scope of the present subject matter.

Accordingly, when the DBMS_3 106 receives the forwarded Query1', the DBMS_3 106 utilizes any matching criteria stored within the associated matching criteria storage area 210 (not shown) to determine whether the received logical table definition matches the local logical table definition for "LT1." Based upon at least one of the data type mismatches between the local "double" data type and the received "bigint" data type for column "a" and the local "char" data type and the received "varchar" data type for column "b," the DBMS_3 106 determines that the local logical table definition does not match the received logical table definition. For purposes of the present example, it is assumed that the DBMS_3 106 casts a data value retrieved from the local physical table storage area 222 (not shown) for the column "a" to the data type "bigint" from the data type "double" and for the column "b" to the data type "varchar" from the data type "char." The DBMS_3 106 also performs a conversion on the data received from the DBMS_4 108.

It should be noted that, based upon the determined mismatch between the received and local logical table definitions for "LT1" at either the DBMS_3 106 and the DBMS_4 108, a warning may be issued to the originating node. The warning may be formed as a portion of the returned data conversion information or sent separately from the data conversion information without departure from the scope of the present subject matter. However, for purposes of the present example, query processing is detailed without warning processing for ease of illustration purposes.

Accordingly, the DBMS_3 106 also creates data conversion information identifying the data conversions performed on the retrieved data in response to performing the data conversions described above. The data conversion information may be in the form of an "array of operations," as described above, or any other convenient format. The DBMS_3 106 appends the local data conversion information to the data conversion information received in the Result_Set1" from the DBMS_4 108. The DBMS_3 106 forwards the locally-converted data including both the locally-retrieved data and some or all of any data received from the DBMS_4 108, the created local data conversion information, and the remote conversion information to the DBMS_2 104 within the present example as a Result_Set1'. If the DBMS_4 108 returns both the original data and converted data, the converted data may be operated upon by the DBMS_3 106, without operation upon the original data.

The DBMS_2 104 receives the Result_Set1' from the DBMS_3 106. As described above, the DBMS_2 104 may have already processed the query upon receipt of the Result_Set1'. The DBMS_2 104 may also have forwarded its results or may accumulate results as the originating node. For purposes of the present example, the DBMS_2 104 accumulates the query results, makes determinations regarding any data casting or conversion operations performed by downstream nodes, and identifies preferences for query route processing. The query routing preferences may be stored within the optimized routing storage area 224 or otherwise for future query routing and processing. As such, the processing of the Query1 described below may have occurred by the time the Result_Set1' is received by the DBMS_2 104.

Regarding processing of the received Result_Set1', the DBMS_2 104 analyzes the returned data conversion information (e.g., an array or operations) and makes a determination as to whether any of the remote data conversion information identifying at least one data conversion operation performed by the downstream node is an acceptable data conversion. The DBMS_2 104 determines whether the data conversion or aggregate of the data conversions performed on the data received from either the DBMS_4 108 or the DBMS_3 106 within the Result_Set1' results in a loss of precision associated with the converted data that is larger than a configured precision loss tolerance. As described above, a precision loss tolerance may be configured and stored within the data conversion and route tracking storage area 212 of the memory 208. The precision loss tolerance may be based upon a percentage of loss in precision, specific casting between certain data types, or any other data precision related criteria. Accordingly, the DBMS_2 104 determines whether the data conversion performed on the data received from the DBMS_4 108 or the DBMS_3 106 within the Result_Set1' results in a loss of precision beyond the configured precision loss tolerance. For purposes of the present example, it is assumed that a casts performed by the respective nodes are acceptable casting operations.

As described above, for a situation where a casting operation were to be considered unacceptable from a precision loss perspective or other consideration, the DBMS_2 104 may reject the data returned from the DBMS_4 108 or from the DBMS_3 106 and note the operation and the processing performed by the respective distributed database node as a non-preferred route within route tracking information appended to and returned in association with the data conversion information to the originating node. The non-preferred route information may also be stored within the optimized routing storage area 224 or the data conversion and route tracking storage area 212 for future reference and use in query routing within a distributed database system, such as the system 100.

Regarding processing of the Query1 at the DBMS_2 104, as the originating node, the DBMS_2 104 defined the logical table definition for the logical table named "LT1." Accordingly, no casting operation is performed within the present example and the data retrieved from local storage, such as the physical table storage area 222, is appended to the data received from the DBMS_4 108 and the DBMS_3 106 and returned to an application-level task (not shown), such as the data conversion and route tracking module 216, for data processing as a Result_Set1.

Accordingly, the example of FIG. 3 illustrates that distributed database nodes within a distributed database system, such as the system 100, may determine whether a data type associated with a received logical table definition differs from a data type associated with a local logical table definition, perform a data conversion on retrieved local physical data and data received from nodes to which this node forwarded the query in response to determining that the data type associated with the received logical table definition differs from the data type associated with a local logical table definition, create data conversion information identifying the data conversion performed on the retrieved physical data in response to performing the data conversion, and forward at least one of the retrieved data and the converted data with the created data conversion information to at least one other distributed database node and an application-level module for further processing. The distributed database nodes may also determine whether received remote data conversion information indicates that a data conversion performed at a remote distributed database node results in a loss of precision that is larger than a configured precision loss tolerance and may reject any data determined to be associated with a loss of precision beyond an acceptable configured tolerance.

Figure 4:
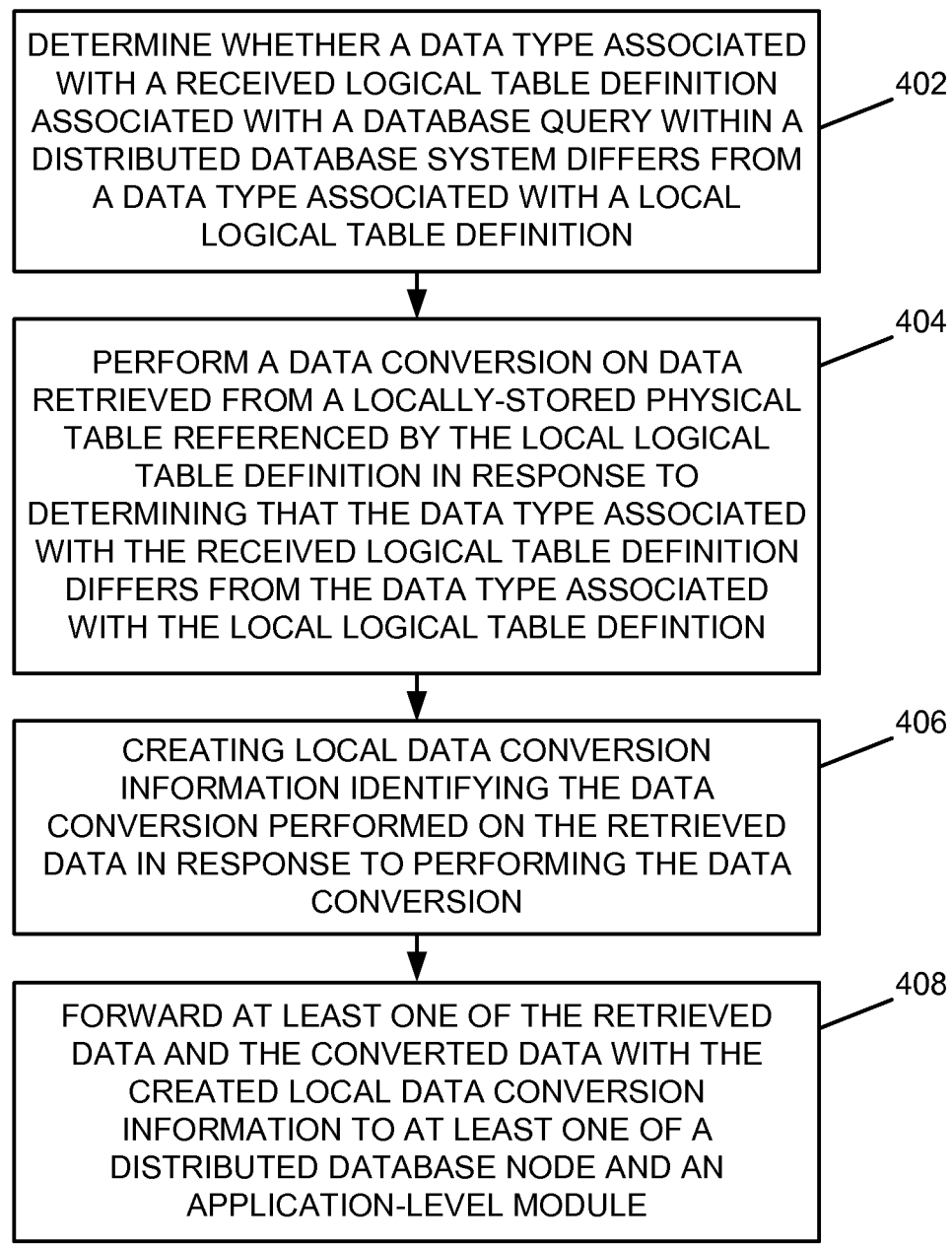
FIG. 4 is a flow chart of an example of an implementation of a process for automated data conversion and route tracking in distributed databases according to an embodiment of the present subject matter.
Figure 5:
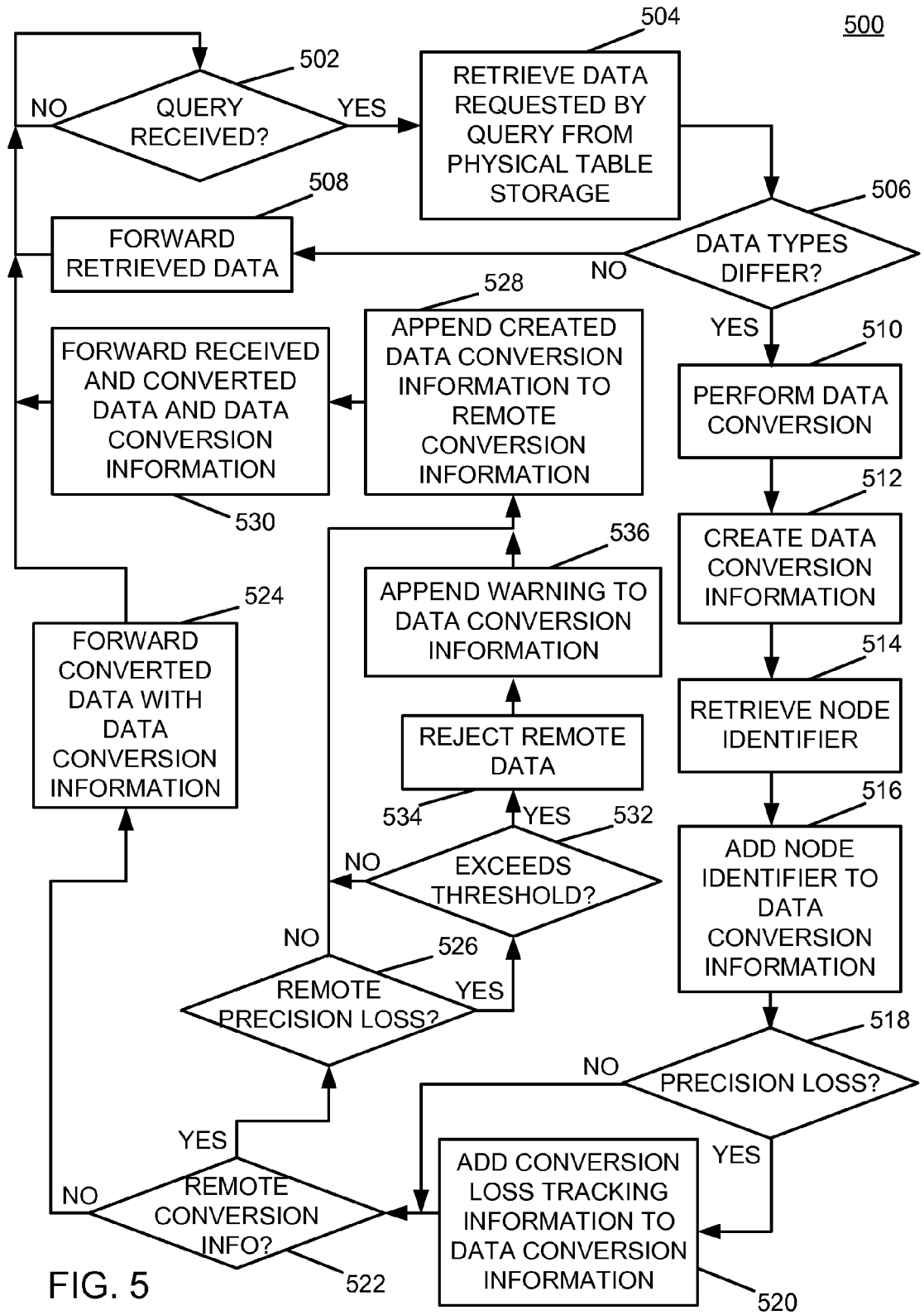
FIG. 5 is a flow chart of an example of an implementation of a process for automated data conversion and route tracking in distributed database systems by generation of data conversion information in response to data conversions and data conversion precision loss according to an embodiment of the present subject matter.
Figure 6:
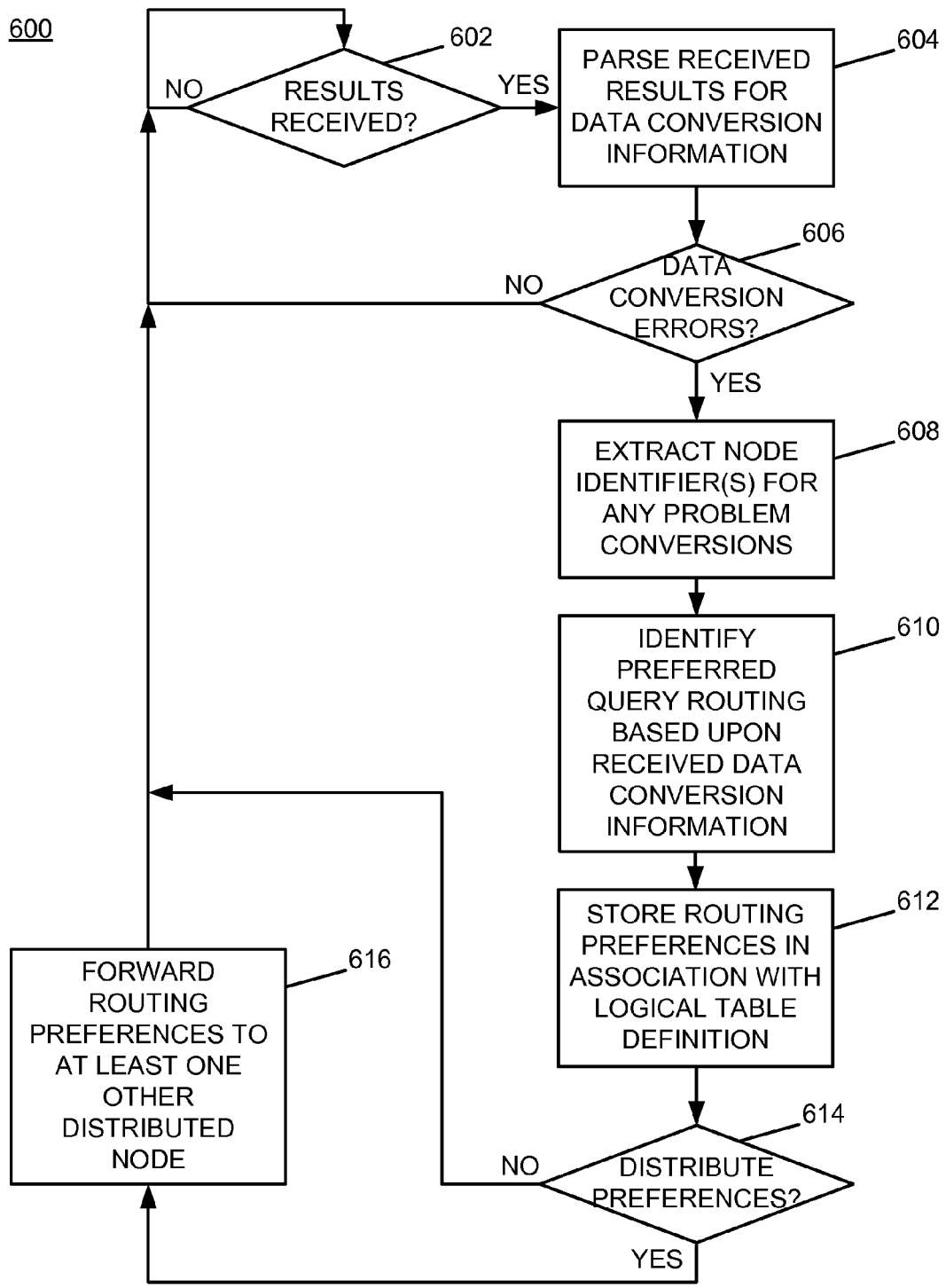
FIG. 6 is a flow chart of an example of an implementation of a process for automated data conversion and route tracking in distributed databases by processing of data conversion information received in response to queries issued within a distributed database system according to an embodiment of the present subject matter.

FIGS. 4 through 6 below describe example processes that may be executed by distributed database devices, such as the DBMS_1 102 through the DBMS_N 112, to perform the automated data conversion and route tracking associated with the present subject matter. The example processes may be performed by modules, such as the data conversion and route tracking module 216 and/or the CPU 200, associated with distributed database devices. It should be noted that time out procedures and other error control procedures are not illustrated within the example processes described below for ease of illustration purposes. However, it is understood that all such procedures are considered to be within the scope of the present subject matter.

FIG. 4 is a flow chart of an example of an implementation of a process 400 for automated data conversion and route tracking in distributed databases. At block 402, the process 400 determines whether a data type associated with a received logical table definition associated with a database query within a distributed database system differs from a data type associated with a local logical table definition. At block 404, the process 400 performs a data conversion on data retrieved from a locally-stored physical table referenced by the local logical table definition in response to determining that the data type associated with the received logical table definition differs from the data type associated with a local logical table definition. At block 406, the process 400 creates local data conversion information identifying the data conversion performed on the retrieved data in response to performing the data conversion. At block 408, the process 400 forwards at least one of the retrieved data and the converted data with the created local data conversion information to at least one of a distributed database node and an application-level module. The activities described above may also be performed on any data returned to the present database node by nodes to which it forwarded the query.

FIG. 5 is a flow chart of an example of an implementation of a process 500 for automated data conversion and route tracking in distributed database systems, such as the system 100, by generation of data conversion information in response to data conversions and data conversion precision loss. At decision point 502, the process 500 waits for a query to be received. For purposes of the present example, it is assumed that a received query has a logical table definition associated with it and that there is a local logical table definition with the same name associated with the distributed database node that receives the query and that is executing the example process 500. Additionally, the logical table definitions define data types, as described above, associated with data represented within physical data storage at the distributed database nodes.

Furthermore, the decision made at decision point 502 may be a determination that a result set has been received in response to a query forwarded to another distributed database node, as described above in association with the example of FIG. 3, without departure from the scope of the present subject matter. As further described above in association with FIG. 3, a distributed database node that forwards a query may wait to process its data request until a result set is obtained from any downstream node(s) or may process the data request concurrently with forwarding a query. As such, the determination at decision point 502 includes any such events. For the situation where a query is received, it is assumed that the query may be forwarded and a result set may also be received at a later time. This additional processing is not illustrated within FIG. 5 for ease of illustration purposes. However, it is understood that any such additional processing is considered within the scope of the present subject matter.

When the process 500 makes a determination at decision point 502 that a query has been received, the process 500 retrieves physical data requested by the query from a physical table storage location, such as the physical table storage area 222, at block 504. At decision point 506, the process 500 makes a determination as to whether the data types referenced within the received logical table and the local logical table differ. Alternatively, the process 500 may make this determination based upon the retrieved physical data without departure from the scope of the present subject matter. The data types may differ due to differences in data field bit count, data type representation (e.g., int, char, varchar, etc.), and other factors associated with the data type representations.

When a determination is made at decision point 506 that the data types do not differ, the process 500 forwards the retrieved data in response to the query at block 508 to at least one of another distributed database node or an application-level module. For example, the process 500 may forward the retrieved data to another distributed database node or to an application-level module within a result set, such as described above in association with FIG. 3. The application-level module may be associated with the data conversion and route tracking module 216 or may be another process or associated with another module or device without departure from the scope of the present subject matter. An application-level module may perform route optimization based upon the data conversion information forwarded from the process 500. An example process for route optimization is described in association with FIG. 6 below. The retrieved data may also be appended to a result set received with the query or received in response to a query forwarded to another distributed database node without departure from the scope of the present subject matter. Upon completion of the processing at block 508, the process 500 returns to decision point 502 to await another query or result set to be received.

Returning to the description of decision point 506, when the process 500 makes a determination that the data types differ, the process 500 performs a data conversion at block 510. The data conversion may include a promotion of the data type of the retrieved physical data, a demotion of the data type of the retrieved physical data, a cast of the data type of the retrieved physical data to another data type, or any other data conversion operation.

At block 512, the process 500 creates data conversion information, such as an array of operations or other type of data organizational structure, including information about the data conversion operation performed. At block 514, the process 500 retrieves a node identifier associated with the distributed database node that is executing the process 500. At block 516, the process 500 adds the node identifier to the data conversion information.

At decision point 518, the process 500 makes a determination as to whether the data conversion that was performed results in a data precision loss. When a determination is made that the data conversion performed results in a data precision loss, the process 500 adds conversion loss tracking information to the data conversion information at block 520. When the conversion loss tracking information has been added to the data conversion information or when a determination is made at decision point 518 that the data conversion performed does not result in a data precision loss, the process 500 makes a determination at decision point 522 as to whether any remote conversion information was received with the query or result set that was received.

When a determination is made at decision point 522 that remote conversion information was not received, the process 500 forwards the converted data with the data conversion information to at least one of another distributed database node or an application-level module for processing at block 524. The process 500 returns to decision point 502 to await another query or result set to be received.

Returning to the description of decision point 522, when a determination is made that remote data conversion information was received, the process 500 makes a determination at decision point 526 as to whether any remote precision loss has occurred. Remote precision loss may be indicated within received remote conversion information by inclusion of conversion loss tracking information. For example, another distributed database node may execute a process similar to the process 500 and add conversion loss tracking information to forwarded data conversion information, such as described above in association with block 520. Presence of conversion loss tracking information within the received query or result set may be used by the process 500 to make the determination as to whether any remote precision loss has occurred.

When a determination is made at decision point 526 that no remote precision loss has occurred, the process 500 appends the created data conversion information to the received remote data conversion information at block 528 and forwards the received and converted data and data conversion information to at least one other distributed database node or an application-level module for processing at block 530. For example, and application-level module may perform route optimization based upon the data conversion information forwarded from the process 500. An example process for route optimization is described in association with FIG. 6 below.

Returning to the description of decision point 526, when a determination is made that remote precision loss has occurred, the process 500 makes a determination at decision point 532 as to whether the remote precision loss has exceeded any defined threshold for precision loss. As described above in association with FIG. 3, the defined threshold may be based upon a precision loss tolerance. A precision loss tolerance may be based upon a percentage of loss in precision, specific casting between certain data types, or any other data precision related criteria. Accordingly, any approach to defining a threshold for precision loss is considered within the scope of the present subject matter.

When a determination is made at decision point 532 that the remote precision loss has not exceeded any defined threshold for precision loss, the process 500 continues to block 528 and continues processing as described above. When a determination is made at decision point 532 that the remote precision loss has exceeded a defined threshold for precision loss, the process 500 rejects the remote data at block 534 and appends a warning to the data conversion information at block 536. The process 500 continues to block 528 and continues processing as described above. However, within the present branch of processing, the process 500 will not forward the received and rejected data to another distributed database node or an application-level module at block 530, as otherwise described above within the present example. The process 500 returns to decision point 502 to await receipt of another query or result set.

As such, the process 500 provides automated data conversion and route tracking in distributed databases by generation of data conversion information in response to data conversions and data conversion precision loss. The process 500 also determines whether received data conversion information indicates a remote precision loss exceeds a defined threshold for precision loss. When the process 500 determines that remote precision loss exceeds a defined threshold for precision loss, the process 500 rejects the received remote data and issues a warning within forwarded data conversion information to document the data conversion tolerance issue. It should also be noted that either the local or a received logical table definition may be forwarded at any of blocks 508, 524, and 530 without departure from the scope of the present subject matter.

FIG. 6 is a flow chart of an example of an implementation of a process 600 for automated data conversion and route tracking in distributed databases by processing of data conversion information received in response to queries issued within a distributed database system, such as the system 100. At decision point 602, the process 600 waits for query processing results, such as a result set, to be received. When a determination is made at decision point 602 that a result set has been received, the process 600 parses the received result set for data conversion information at block 604.

At decision point 606, the process 600 makes a determination as to whether any data conversion errors are identified within the received result set. For purposes of the present example, presence of a warning or conversion loss tracking information within the received data conversion information may be used to determine whether any data conversion errors have occurred during processing of a query within a distributed database system. When a determination is made that no data conversion errors are identified within the received result set, the process 600 returns to decision point 602 to await receipt of additional query processing results.

When a determination is made at decision point 606 that at least one data conversion error is identified within the received result set, the process 600 extracts a node identifier or node identifiers, as appropriate, from the data conversion information for any problem conversions at block 608. At block 610, the process 600 identifies any preferred routing based upon the received data conversion information. For example, routing preferences may be established to avoid or mitigate data conversion precision loss for future queries of the same or similar data associated with a logical table definition.

Any defined routing preferences are stored in association with the logical table definition for the affected data at block 612. For example, the routing preferences may be stored within the optimized routing storage area 224 in association with a logical table or logical tables stored within the logical table definition storage area 220.

At decision point 614, the process 600 makes a determination as to whether to distribute the defined routing preferences to other distributed database nodes for storage at those distributed database nodes. It should be noted that routing preferences may also be passed with a logical table definition associated with a future query. Accordingly, the process 600 may opt to not distribute the defined routing preferences and return to decision point 602 to await receipt of another result set.

When a determination is made at decision point 614 to distribute the defined routing preferences, the process 600 forwards the routing preferences to at least one other distributed database node at block 616. The process 600 returns to decision point 616 and continues processing as described above.

As such, the process 600 provides automated data conversion and route tracking in distributed databases by processing data conversion information received in response to queries issued within a distributed database system. The process 600 identifies preferred routing for future queries based upon data conversion errors identified within received data conversion tracking information received in response to issued queries. The process 600 may store the defined preferred routing and may distribute the preferred routing to other distributed nodes within the distributed database system.

Accordingly, as described above in association with FIGS. 1 through 6, the example systems and processes provide automated data conversion and route tracking in distributed databases. Many other variations and additional activities associated with automated data conversion and route tracking in distributed databases are possible and all are considered within the scope of the present subject matter.

Those skilled in the art will recognize, upon consideration of the above teachings, that certain of the above exemplary embodiments are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
receiving, by a local sub-system from a remote sub-system of a distributed database system, over a communication network and from a requestor, a database query that comprises as received (i) a query select statement to be performed locally by the local sub-system, and (ii) a remote logical table definition that comprises remote logical table element names and element data type formatting of a remote logical table defined at the remote sub-system;
parsing the database query to determine logical table definition data indicative of the remote logical table element names and element data type formatting of the remote logical table definition;
determining, by use of the received remote logical table element names and element data type formatting, whether a data type associated with element(s) of the remote logical table definition received within the database query and requested by the received query select statement differs from a data type associated with element(s) of a local logical table definition that comprises matching logical table element names;
performing a data conversion on data retrieved from a locally-stored physical table referenced by the local logical table definition in response to determining that the data type associated with the requested element(s) of the remote logical table definition differs from the data type associated with the element(s) of the local logical table definition that comprises the matching logical table element names;
creating local data conversion information identifying the data conversion performed on the retrieved data in response to performing the data conversion; and
forwarding at least one of the retrieved data and the converted data with the created local data conversion information to at least one of a distributed database node and an application-level module.

2. The method of claim 1, where performing the data conversion on the retrieved data comprises at least one of promoting a data type associated with the retrieved data to the data type associated with the received remote logical table definition, demoting a data type associated with the retrieved data to the data type associated with the received remote logical table definition, and casting a data type associated with the retrieved data to the data type associated with the received remote logical table definition.

3. The method of claim 1, where creating the local data conversion information identifying the data conversion performed on the retrieved data in response to performing the data conversion comprises adding a node identifier of the local sub-system to the local data conversion information.

4. The method of claim 1, further comprising one of:
matching, by comparison of the remote logical table definition with local logical table definitions, element(s) of the remote logical table definition requested by the query select statement to element(s) of the local logical table definition that references a locally-stored physical table against which to perform the query select statement; or
determining whether the data conversion performed on the retrieved data results in a loss of precision associated with the converted data.

5. The method of claim 1, where creating the local data conversion information identifying the data conversion performed on the retrieved data in response to performing the data conversion comprises adding local conversion precision loss tracking information to the local data conversion information in response to determining that the data conversion performed on the retrieved data results in a loss of precision associated with the converted data.

6. The method of claim 1, further comprising:
receiving remote data and remote data conversion information in association with the received remote logical table definition, where the remote data conversion information identifies at least one data conversion operation performed on the received remote data by at least one other node within the distributed database system; and
performing a data conversion on the received remote data in response to determining that the data type associated with the received remote logical table definition differs from the data type associated with the respective element(s) of the local logical table definition that comprise the matching logical table element names.

7. The method of claim 6, where creating the local data conversion information identifying the data conversion performed on the retrieved data in response to performing the data conversion comprises appending the created local data conversion information to the received remote data conversion information.

8. The method of claim 7, further comprising responding to the database query with at least one of the retrieved data and the converted data with the created local data conversion information, the received remote data conversion information with the appended local data conversion information, and at least one of the received remote data and the converted remote data to the at least one of the distributed database node and the application-level module.

9. The method of claim 6, further comprising:
determining whether the received remote data conversion information comprises remote conversion precision loss tracking information;
determining whether the data conversion performed on the received remote data results in a loss of precision that is larger than a configured precision loss tolerance based upon the received remote conversion precision loss tracking information; and
rejecting the received remote data in response to determining that the data conversion performed on the received remote data is larger than the configured precision loss tolerance.

10. The method of claim 6, further comprising identifying preferred query routing within the distributed database system that minimizes future data casting operations based upon the received remote data conversion information.

11. A system, comprising:
a memory adapted to store data conversion and route tracking information; and
a processor programmed to:
receive, at a local sub-system from a remote sub-system of a distributed database system, over a communication network and from a requestor, a database query that comprises as received (i) a query select statement to be performed locally by the local sub-system, and (ii) a remote logical table definition that comprises remote logical table element names and element data type formatting of a remote logical table defined at the remote sub-system;
parse the database query to determine logical table definition data indicative of the remote logical table element names and element data type formatting of the remote logical table definition;
determine, by use of the received remote logical table element names and element data type formatting, whether a data type associated with element(s) of the remote logical table definition received within the database query and requested by the received query select statement differs from a data type associated with element(s) of a local logical table definition that comprises matching logical table element names;
perform a data conversion on data retrieved from a locally-stored physical table referenced by the local logical table definition in response to determining that the data type associated with the requested element(s) of the remote logical table definition differs from the data type associated with the element(s) of the local logical table definition that comprises the matching logical table element names;
create local data conversion information identifying the data conversion performed on the retrieved data in response to performing the data conversion;
store the local data conversion information to the memory; and
forward at least one of the retrieved data and the converted data with the created local data conversion information to at least one of a distributed database node and an application-level module.

12. The system of claim 11, where, in being programmed to perform the data conversion on the retrieved data, the processor is programmed to at least one of promote a data type associated with the retrieved data to the data type associated with the received remote logical table definition, demote a data type associated with the retrieved data to the data type associated with the received remote logical table definition, and cast a data type associated with the retrieved data to the data type associated with the received remote logical table definition.

13. The system of claim 11, where, in being programmed to create the local data conversion information identifying the data conversion performed on the retrieved data in response to performing the data conversion, the processor is programmed to add a node identifier of the local sub-system to the local data conversion information.

14. The system of claim 11, where the processor is further programmed to one of:
match, by comparison of the remote logical table definition with local logical table definitions, element(s) of the remote logical table definition requested by the query select statement to element(s) of the local logical table definition that references a locally-stored physical table against which to perform the query select statement; or
determine whether the data conversion performed on the retrieved data results in a loss of precision associated with the converted data.

15. The system of claim 11, where, in being programmed to create the local data conversion information identifying the data conversion performed on the retrieved data in response to performing the data conversion, the processor is programmed to add local conversion precision loss tracking information to the local data conversion information in response to determining that the data conversion performed on the retrieved data results in a loss of precision associated with the converted data.

16. The system of claim 11, where the processor is further programmed to:
receive remote data and remote data conversion information in association with the received remote logical table definition, where the remote data conversion information identifies at least one data conversion operation performed on the received remote data by at least one other node within the distributed database system; and
perform a data conversion on the received remote data in response to determining that the data type associated with the received remote logical table definition differs from the data type associated with the respective element(s) of the local logical table definition that comprise the matching logical table element names.

17. The system of claim 16, where, in being programmed to create the local data conversion information identifying the data conversion performed on the retrieved data in response to performing the data conversion, the processor is programmed to append the created local data conversion information to the received remote data conversion information.

18. A method, comprising:
receiving, by a local sub-system of a distributed database system, a local table definition defining a local table of data, the local table definition including information indicative of: (i) a plurality of local table element names, and (ii) for each local table element name of the plurality of local table element names, a respectively corresponding data type;

receiving, by the local sub-system, from a remote requestor sub-system of the distributed database system, a database query that includes: (1) a query select statement including information indicative of requested data from the local table of data, and (2) a remote requestor table definition including information indicative of: (a) a plurality of remote requestor table element names, and (b) for each remote requestor table element name of the plurality of remote requestor table element names, a respectively corresponding data type;

determining that a first remote requestor table element name, included in the query select statement, corresponds to a first local table element name;

retrieving raw query response data from the local table of data, with the raw query response data being data that is responsive to the query select statement, and with the raw query response data including raw first element data corresponding to the first local table element name;

determining that a data type corresponding to the first local table element name does not match a data type corresponding to the first remote requestor table element name; and responsive to the determination that the data type corresponding to the first local table element name does not match the data type corresponding to the first remote requestor table element name, converting the raw first element data, having the data type corresponding to first local table element name, to converted first element data, having the data type corresponding to the first remote requestor table element name.

19. The method of claim 18, further comprising:

responsive to the conversion of the raw first element data of the raw query response data, creating first conversion information identifying the conversion of the raw first element data of the raw query response data; and sending, by the local sub-system, over a communication network and to a destination device, the raw query response data and the first conversion information.

20. The method of claim 18, further comprising:

replacing the raw first element data of the raw query response data with the converted first element data to obtain converted query response data;

responsive to the conversion of the raw first element data of the raw query response data, creating first conversion information identifying the conversion of the raw first element data of the raw query response data; and sending, by the local sub-system, over a communication network and to a destination device, the converted query response data and the first conversion information.

* * * * *